United States Patent [19]

Muraki et al.

[11] 3,983,217

[45] Sept. 28, 1976

[54] METHOD FOR REMOVING SULFUR DIOXIDE FROM WASTE GASES

[75] Inventors: Ryoji Muraki; Masao Endo, both of Nishinomiya; Nobuaki Aoki, Hirakata; Kazuo Mizutani, Takatsuki; Norio Fukui, Nishinomiya, all of Japan

[73] Assignee: Kurashiki Boseki Kabushiki Kaisha, Japan

[22] Filed: Sept. 16, 1974

[21] Appl. No.: 506,048

[30] Foreign Application Priority Data

Sept. 26, 1973 Japan.............................. 48-108176

[52] U.S. Cl................................. 423/242; 423/545
[51] Int. Cl.².......................................... C01B 17/00
[58] Field of Search........................... 423/242–244, 423/522, 543, 549

[56] References Cited
UNITED STATES PATENTS 2,676,090  4/1954  Johnstone........................... 423/242
2,862,789  12/1958  Burgess............................... 423/522
3,836,630  9/1974  Noguchi et al. .................... 423/522

FOREIGN PATENTS OR APPLICATIONS 1,181,703  2/1970  United Kingdom................. 423/242

*Primary Examiner*—Oscar R. Vertiz
*Assistant Examiner*—Gregory A. Heller
*Attorney, Agent, or Firm*—Wenderoth, Lind & Ponack

[57] ABSTRACT

A method for removing sulfur dioxide from waste gases by a wet oxidation-absorption method, which is characterized in that an aqueous solution of ammonium sulfate acidified with sulfuric acid at a pH range of 3 – 4 is used as the absorbent. The $SO_2$ contained in the waste gases is absorbed with the aqueous solution of ammonium sulfate in an absorption tower and then oxidized with air or oxygen to be converted into sulfuric acid in an oxidation tower.

9 Claims, 6 Drawing Figures

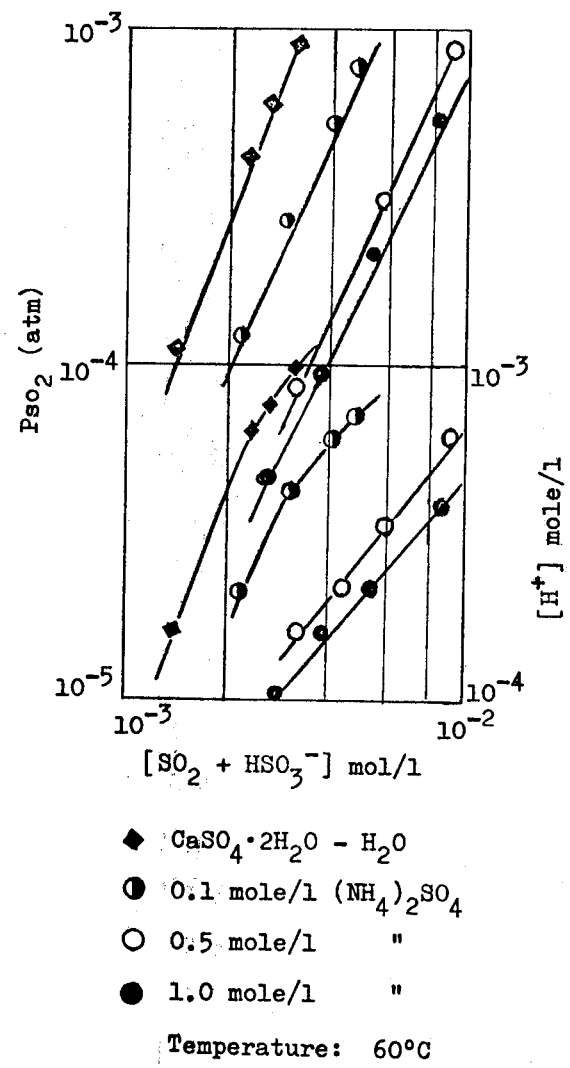
Figure I
- ◆ CaSO$_4$·2H$_2$O − H$_2$O
- ◐ 0.1 mole/l (NH$_4$)$_2$SO$_4$
- ○ 0.5 mole/l  "
- ● 1.0 mole/l  "
Temperature: 60°C

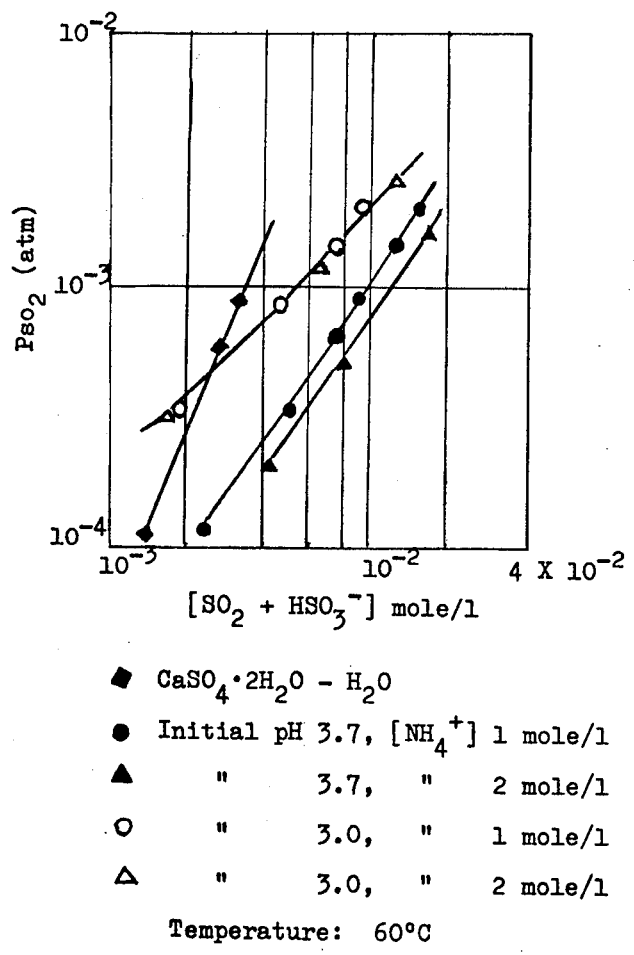
Figure II

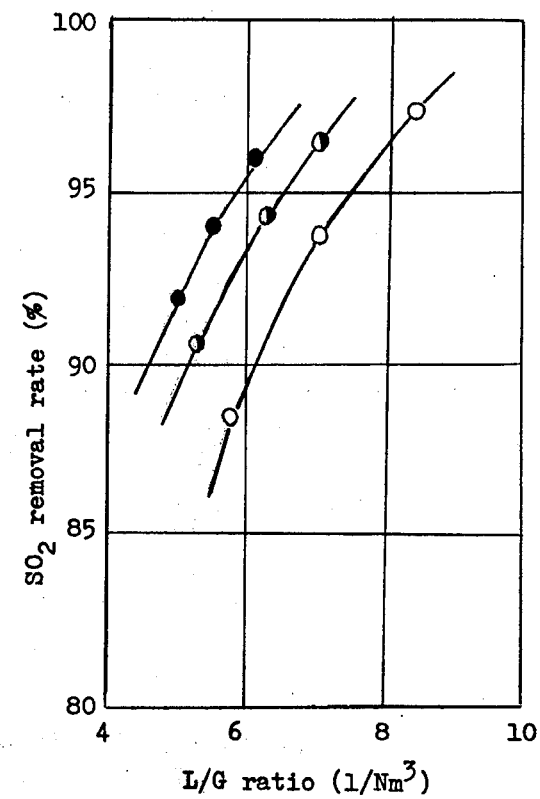
Figure III

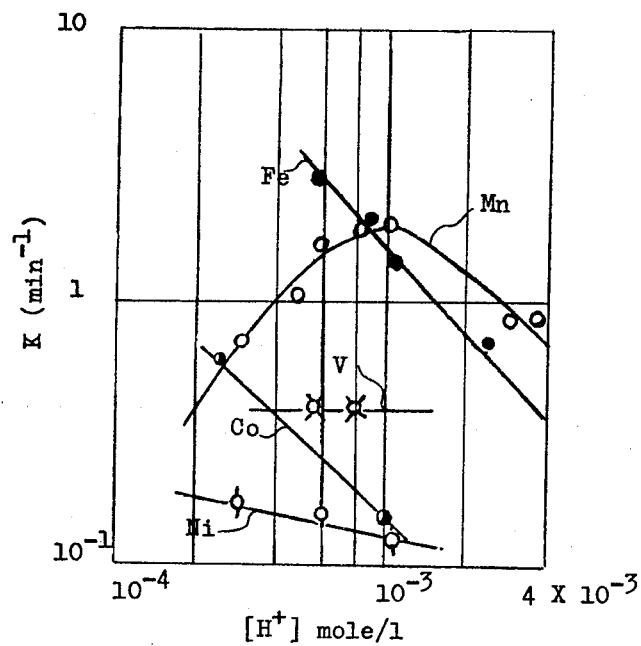
Figure IV

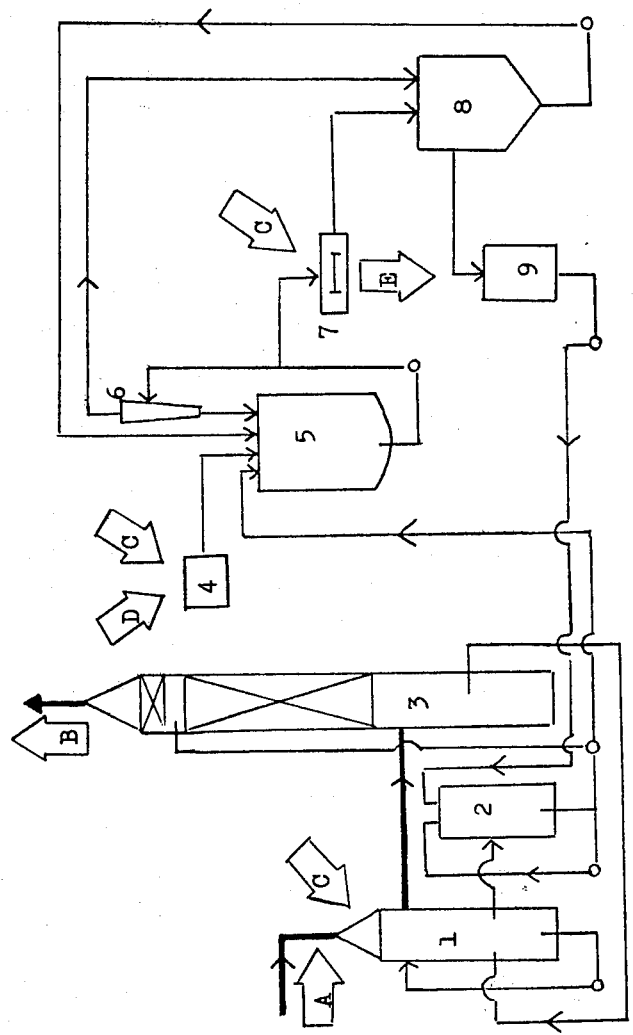
Figure V

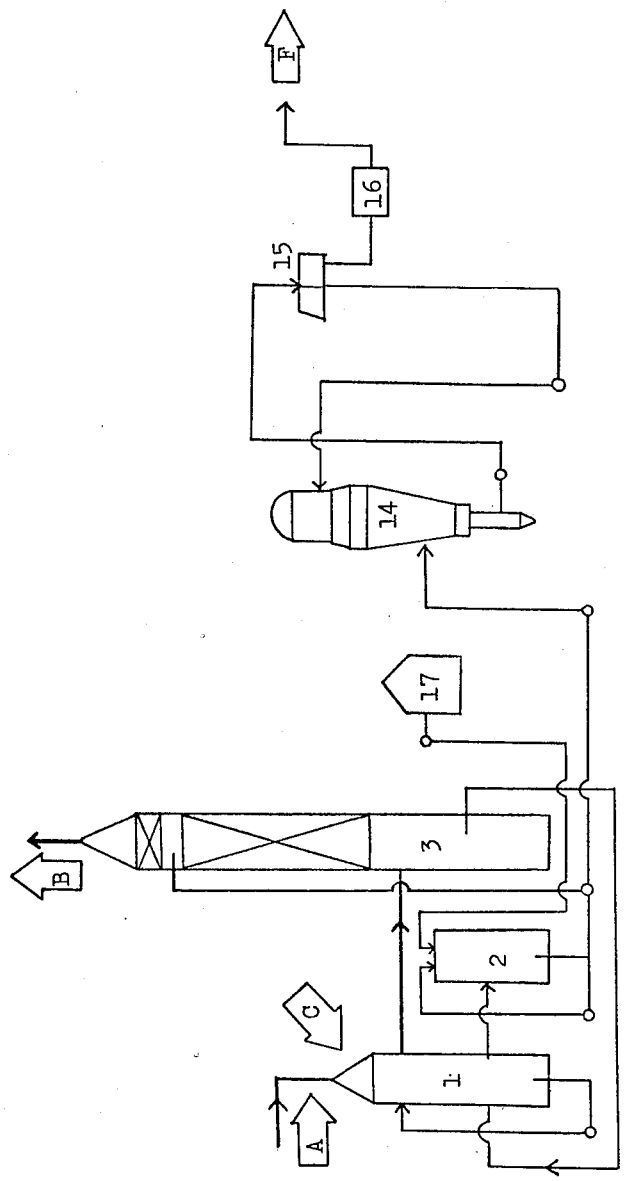
Figure VI

METHOD FOR REMOVING SULFUR DIOXIDE FROM WASTE GASES

The present invention relates to a method for removing sulfur dioxide from waste gases. More particularly, it relates to a method for removing sulfur dioxide from waste gases by a wet oxidation-absorption method wherein an aqueous ammonium sulfate acidified with sulfuric acid is used as the absorbent.

The so-called "wet oxidation-absorption method" is one of the wet $SO_2$-removal methods and comprises oxidizing sulfur dioxide ($SO_2$) absorbed in an absorbent to give sulfate ion having no $SO_2$ partial pressure and thereby the $SO_2$ absorbing capacity of the absorbent being recovered and then circulating the recovered absorbent.

According to this method, when a diluted sulfuric acid is used as the absorbent, it is necessary to contact the waste gas containing $SO_2$ with much absorbent in the $SO_2$ absorption tower because the diluted sulfuric acid has an extremely small $SO_2$ solubility, and therefore the L/G ratio (ratio of liquid to gas) of the absorption tower must be 60–100 liter/Nm³ to enhance the $SO_2$ removing ratio to 90–95 %. Accordingly, in the removal of sulfur dioxide from waste gases by such conventional method, an extremely big absorption tower is needed to effect such large L/G ratio.

Under these circumstances, the present inventors have extensively studied to find an improved method for removing sulfur dioxide from waste gases by using a small scale absorption tower, and then found that the L/G ratio of an absorption tower can be decreased by using an aqueous ammonium sulfate acidified with sulfuric acid in a pH range of 3–4 as the absorbent.

An object of the present invention is to provide a method for removing sulfur dioxide from waste gases wherein the L/G ratio of the absorption tower is decreased.

Another object of the invention is to provide a method for easily oxidizing the absorbed sulfur dioxide.

A further object of the invention is to provide a method for removing sulfur dioxide from waste gases, in which the sulfur component can be recoverd in the form of gypsum ($CaSO_4 \cdot 2H_2O$).

A still further object of the invention is to provide a method for removing sulfur dioxide from waste gases, in which the sulfur component can be recovered in the form of ammonium sulfate.

A more further object of the invention is to provide a method for removing sulfur dioxide from waste gases which is suitably applied to in a closed system.

These and other objects of the invention will be apparent from the description hereinafter.

Generally, when the $SO_2$ is dissolved in water, it is partially dissociated to $HSO_3^-$ and the remaining part is dissolved without dissociation. The dissolution of $SO_2$ in water is shown by the following equilibrium state (1) and it may be shown by the following equations (2) and (3):

$$P_{SO_2} \rightleftarrows (SO_2) + H_2O \rightleftarrows H^+ + HSO_3^- \qquad (1)$$

$$P_{SO_2} = H \cdot (SO_2) \qquad (2)$$

wherein $P_{SO_2}$ represents the $SO_2$ partial pressure, ($SO_2$) represents the dissolved but not dissociated $SO_2$, H represents the Henry coefficient, and K represents the primary dissociation constant of sulfurous acid.

When the pH value of the absorbent is not more than 4, the secondary dissociation of sulfurous acid can be disregarded, and therefore, only the equations (2) and (3) may be taken into consideration. The equations (2) and (3) may be rewritten as the following equation (4):

When ($H^+$) is lower, K is larger and H is smaller, $P_{SO_2}$ becomes lower.

The present inventors have made studies to determine suitable absorption conditions for decreasing the L/G ratio of the absorption tower by applying the above equation to the wet oxidation-absorption method and thereby absorbing the $SO_2$ into the absorbent efficiently.

The absorbent used in the $SO_2$-removal method for heavy oil combustion gas is usually used at a temperature of around 60°C. And then, there have been studied the Henry coefficient, the primary dissociation constant of sulfurous acid and the relationship between the $SO_2$ partial pressure and the concentration of $SO_2$ + $HSO_3^-$ or of the hydrogen ion in solution at 60°C. The Henry coefficient and the primary dissociation constant of sulfurous acid under the conditions of temperature: 60°C and the $SO_2$ partial pressure: $10^{-6} - 10^{-3}$ have not been formally reported and therefore have been experimentally confirmed by using aqueous ammonium sulfate by the present inventors. The results are shown in Table 1.

Table 1

| (NH₄)₂SO₄ — SO₂ — H₂O Equilibrium | | |
|---|---|---|
| Liquid composition | H (atm·liter·mole⁻¹) | K |
| 0.1 mole/liter (NH₄)₂SO₄ | 2.35 | 1.0 × 10⁻² |
| 0.5 mole/liter (NH₄)₂SO₄ | 2.55 | 1.5 × 10⁻² |
| 1.0 mole/liter (NH₄)₂SO₄ | 2.80 | 1.6 × 10⁻² |
| 2.0 mole/liter (NH₄)₂SO₄ | 3.60 | 1.6 × 10⁻² |
| 3.0 mole/liter (NH₄)₂SO₄ | 4.40 | 1.7 × 10⁻² |
| Saturated solution of CaSO₄·2H₂O | 2.27 | 0.7 × 10⁻² |

In the above experiment, the reason for using the saturated solution of gypsum ($CaSO_4 \cdot 2H_2O$) as the control $SO_2$ absorbent is that the $SO_2$ absorbent sent back from the gypsum forming step to the $SO_2$ absorption tower is saturated by calcium sulfate in the gypsum recovery process, and therefore, the experimental conditions becomes similar to those of such gypsum recovery process.

On the basis of the above experimental results, the $SO_2$ partial pressure of the 0.5 mole/liter $(NH_4)_2SO_4$ solution and the gypsum saturated solution at the same pH value and the same concentration of $SO_2 + HSO_3^-$ was calculated by the above equation (4) at a pH value of 3–4. As a result, the $SO_2$ partial pressure of the $(NH_4)_2SO_4$ solution is found to be about half of that of the gypsum saturated solution.

The SO₂ absorbed solution shows a lower pH value due to the hydrogen ion which occurs with the dissociation of the dissolved SO₂.

FIG. I shows the relationship of the pH value, $P_{SO_2}$ and the concentration of $SO_2 + HSO_3^-$ when $SO_2$ is dissolved in the gypsum saturated solution and 0.1, 0.5 or 1.0 mole/liter $(NH_4)_2SO_4$ solution. As is clear from FIG. I, when the concentration of the dissolved sulfate is higher, the increase in $(H^+)$ is smaller. This can be also understood from the fact that the following approximate equation may be theoretically written for the $(NH_4)_2SO_4-H_2SO_4-SO_2-H_2O$ system at a pH value of 2-4.

$$2C_b = \frac{(H^+) + 2K_{21}}{(H^+) + K_{21}} \cdot C_2 + \frac{K_{12}}{(H^+) + K_{12}} C_1 \quad (5)$$

wherein $C_b$ represents $(NH_4^+)$, $C_2$ represents $(SO_4^{--} + HSO_4^-)$, $C_1$ represents $(SO_2 + HSO_3^-)$, $K_{21}$ represents the secondary dissociation constant of sulfuric acid, and $K_{12}$ represents the primary dissociation constant of sulfurous acid. The experimental value of $K_{21}$ at a temperature of 60°C is shown in Table 2.

Table 2

| $(NH_4)_2SO_4 - H_2SO_4 - H_2O$ Equilibrium | |
|---|---|
| Liquid composition | K (the secondary dissociation constant) |
| 0.1 mole/liter $(NH_4)_2SO_4$ | $1.0 \times 10^{-2}$ |
| 0.5 mole/liter $(NH_4)_2SO_4$ | $1.9 \times 10^{-2}$ |
| 1.0 mole/liter $(NH_4)_2SO_4$ | $2.6 \times 10^{-2}$ |
| 2.0 mole/liter $(NH_4)_2SO_4$ | $2.6 \times 10^{-2}$ |
| 3.0 mole/liter $(NH_4)_2SO_4$ | $2.6 \times 10^{-2}$ |

It is experimentally confirmed that the above approximate equation and constant can be correctly employed by measuring the $SO_2$ partial pressure ($P_{SO_2}$) and the concentration of $(SO_2 + HSO_3^-)$ when $SO_2$ is absorbed in 0.5 and 1.0 mole/liter $(NH_4)_2SO_4$ at a pH value of 3.7 and 3.0, respectively, which results are shown in FIG. II.

On the basis of the above experimental results, the minimum L/G ratio for removing $SO_2$ in a rate of 95 % at a temperature of 60°C by using a countercurrent differential contacting absorption tower may be calculated, which is shown in Table 3.

Table 3

| Inlet $SO_2$ concentration and minimum L/G (liter/Nm³) | | | | |
|---|---|---|---|---|
| Absorbent | | Minimum L/G (liter/Nm³) | | |
| | | Inlet $SO_2$ concentration (ppm) | | |
| Composition | Initial pH | 1,000 | 2,000 | 3,000 |
| $CaSO_4 \cdot 2H_2O - H_2O$ | 7.0 | 14.0 | 21.2 | 27.3 |
| 0.25 mole/liter $(NH_4)_2SO_4$ | 3.5 | 6.2 | 7.3 | 9.4 |
| 0.5 mole/liter $(NH_4)_2SO_4$ | 3.5 | 5.1 | 5.8 | 7.2 |
| 1.0 mole/liter $(NH_4)_2SO_4$ | 3.5 | 4.2 | 5.4 | 6.3 |
| 2.0 mole/liter $(NH_4)_2SO_4$ | 3.5 | 4.2 | 5.0 | 5.7 |
| 3.0 mole/liter $(NH_4)_2SO_4$ | 3.5 | 4.6 | 5.2 | 5.8 |

As is clear from the above experimental results, the L/G ratio effective for removing $SO_2$ in a removal rate of 95 % by using 0.5-3.0 mole/liter $(NH_4)_2SO_4$ (pH 3.5) is around one-third to one-fourth of that using the $CaSO_4 \cdot 2H_2O$ saturated solution.

Thus, according to the present inventors' studies, it has been found that the L/G ratio of the absorption tower can be significantly decreased by using an ammonium sulfate acidified with sulfuric acid to a pH value of 3-4.

The $SO_2$ absorption method of the present invention is advantageously applied to the conventional $SO_2$-removal method for waste gases, particularly to the wet oxidation-absorption method. For instance, when the present method is applied to a gypsum recovery process, the process may be carried out as follows:

The sulfur dioxide-containing waste gases are first absorbed (the $SO_2$ removal rate: 95 % or more) in the absorption tower wherein an ammonium sulfate acidified with sulfuric acid to a pH range of 3-4 is used as the absorbent; the resulting $SO_2$-absorbed absorbent is subjected to oxidation in an oxidation tower wherein the absorbed $SO_2$ is oxidized with air or oxygen to give sulfuric acid, which results in lowering of the pH value of the absorbent, and therefore, the pH value of the absorbent is maintained at 3-4 by supplying thereto aqueous ammonia and thereby the $SO_2$ absorbing capacity of the absorbent is recovered (the recovered absorbent is circulated to the absorption tower); and a part of the resulting solution containing ammonium sulfate is transferred to gypsum reactor, in which the ammonium sulfate is reacted with calcium hydroxide or oxide to give gypsum and aqueous ammonia (the recovered aqueous ammonia is circulated to control the pH value of the absorbent in the oxidation tower).

When the present method is applied to an ammonium recovery process, the process may be carried out as follows:

The sulfur dioxide-containing waste gases are first absorbed in the absorption tower and the resultant $SO_2$-containing absorbent is subjected to oxidation in an oxidation tower in the same manner as described in the above gypsum recovery process. After the lowered pH value of the absorbent is controlled at 3-4 by supplying thereto aqueous ammonia and thereby the $SO_2$ absorbing capacity of the absorbent is recovered, a part of the resulting solution containing ammonium sulfate is transferred to an ammonium sulfate-crystallizer, wherein the solution is concentrated to give crystals of ammonium sulfate.

The present method may be usually carried out at a temperature of 50° to 60°C. The L/G ratio of the absorption tower and the suitable concentration of the aqueous solution of ammonium sulfate vary depending on the concentration of $SO_2$ contained in the waste gases to be treated, but are usually 5 to 10 liter/Nm³ and 0.1 to 3.0 mole/liter, respectively.

According to the present method, the removal of sulfur dioxide from the waste gas of a boiler wherein a heavy oil is burnt is tested by using a countercurrent contact type packed tower (tower sectional area: 1 m², bed height: 2 m, packings: Netwring HA-18 (trade name of the Product of Dainippon Plastics Co., Ltd.), and gas velocity in the tower: 1.4–1.7 m/sec.). In this test, the concentration of $SO_2 + HSO_3^-$ in the absorbent supplied from the top of the tower is $10^{-4}$ mole/liter or less and the temperature of the absorbent is 57°–58°C. The results are shown in FIG. III.

The absorbed $SO_2$ in the absorption tower is then oxidized in an oxidation tower, and thereby it is converted into sulfate ion having no $SO_2$ partial pressure.

It is usually considered that the oxidation of $HSO_3^-$ or $SO_3^{--}$ with air is a radical reaction accelerated by a metal ion catalyst. It is well known that when the concentration of $HSO_3^-$ or $SO_3^{--}$ is high, the rate of oxidation with air is determined by the rate-determining step of the dissolution of $O_2$, but on the other hand, when the concentration of $HSO_3^-$ or $SO_3^{--}$ is low, the oxidation reaction is a primary reaction depending on the ion concentration thereof, and further that the pH value at which the catalyst shows the maximum catalytic activity varies by the kind of the metal ion used.

Thus, the oxidation of $SO_2$ in the present invention may be preferably carried out in the presence of a metal ion selected from the transition group, such as iron, nickel, cobalt or manganese. Such metal ion may be supplied in a form of oxide, sulfide, sulfate, nitrate, carbonate, chloride or the like of these metals, but the waste gases to be treated sometimes contain a sufficient amount of such metal ion, and in such case, it is not necessary to freshly add it. The concentration of the metal in the absorbent may be preferably 1 to 1,000 ppm. Furthermore, the oxidation may be preferably carried out at a temperature of 50° to 80°C.

By using a circulation-type reactor, the oxidation velocity is tested, in which the concentration of $HSO_3^-$ is less than $10^{-2}$ mole/liter, the concentration of the metal ion is $2 \times 10^{-2}$ mole/liter, the pH value is 4–2.5, the temperature is 40°C and the air is blown into the reactor through a porous air diffuser plate. The oxidation proceeds by a primary reaction depending on the concentration of $HSO_3^-$ and the oxidation constants are as shown in FIG. IV.

As made clear from the FIG. IV, the oxidation velocity is maximum at pH 3 and 4 in case of $Mn^{++}$ and $Fe^{++}$, respectively. Thus, in case of using inexpensive iron, the oxidation velocity is approximately parallel with the converse of the hydrogen ion concentration, and further the oxidation velocity decreases at a pH value of more than 4 in case of iron ion.

From these test results, it is made clear that when a slight amount of iron ion is used, the absorbed $SO_2$ can be rapidly oxidized with air in a pH range of 3–4 and the concentration of $SO_2$ becomes lower than $10^{-4}$ mole/liter, which can not be achieved by oxidation at a pH value of more than 4.

The activation energy of the oxidation reaction is shown by the equation: $E = 47.4 \times 10^3$ cal/mole°K when using iron ion, and the oxidation reaction depends highly on the temperature. Accordingly, the method of the present invention wherein the oxidation and the absorption are repeatedly carried out is advantageous in comparison with the conventional method wherein a sulfurous compound (e.g. calcium sulfite in case of producing gypsum by an air oxidation) is removed from the reaction system and is then oxidized with air, because the temperature of the reaction system of the present invention can be easily maintained at a high temperature.

Furthermore, the oxidation velocity is measured according to the oxidation with a fine air bubble which occurs when a part of the liquid to be oxidized is sprayed from a nozzle. In such method, when it is measured by using 0.5 mole/liter $Na_2SO_3$ (the concentration of $SO_3^{--} + HSO_3^-$: $10^{-2}$ mole/liter or more), $CO^{++}$ being $2 \times 10^{-4}$ mole/liter at a pH value of 9–8, the oxidation velocity is 0.6–0.8 kg.mole/m³.H. On the other hand, when it is measured by using an aqueous solution of ammonium sulfate, wherein $SO_2$ is absorbed and 10 ppm of iron ion is contained, at a pH value of 3.7–3.5 and at 60°C, the oxidation velocity is 0.8–1.0 kg.mole/m³.H. Thus, in both solutions, the oxidation velocity is similar. It means that under the conditions of pH value: 3.7–3.5, the concentration of $Fe^{++}$: $2 \times 10^{-4}$ mole/liter and the concentration of $HSO_3^-$: less than $10^{-2}$ mole/liter, the oxidation velocity depends predominantly on the velocity of the dissolution of air and the oxidation velocity is extremely rapid.

When an aqueous solution of $(NH_4)_2SO_4$ having a pH value of more than 4 is used as the absorbent in the method for removing sulfur dioxide from the waste gases, the absorbent has an $NH_3$ partial pressure and the ammonia is reacted with $SO_2$ or $SO_3$ to form an aerosol which results in the formation of a blue smoke from the gases to be treated after the desulfurization process. Furthermore, when the absorbent has a pH value of more than 4, the pH value is largely changed during the course of absorption step and therefore it is very difficult to control the pH value in the oxidation tower. Thus, it is disadvantageous to use an absorbent having a pH value of more than 4.

As explained above, according to the present invention wherein an aqueous solution of $(NH_4)_2SO_4$ having a pH range of 3–4, the L/G ratio of the $SO_2$ absorption tower can be decreased to ⅓–¼ and further the size of the oxidation tower can be also decreased in comparison with the conventional method using a diluted sulfuric acid as the absorbent.

When the $SO_2$ absorption and the oxidation thereof are repeated, sulfate ion is accumulated in the absorbent, from which the sulfate ion may be separated in a form of a gypsum (i.e. calcium sulfate) or in a form of ammonium sulfate.

When the sulfate ion is recovered in a form of a gypsum, after repeating the $SO_2$ absorption and the oxidation thereof by the present method, a part of the resultant solution wherein sulfate ion is accumulated is then transferred to the gypsum reactor wherein the $(NH_4)_2SO_4$ is reacted with calcium hydroxide or oxide [$Ca(OH)_2$ or $CaO$] to give gypsum and ammonia as shown by the following reaction scheme:

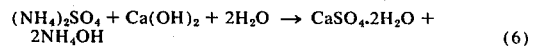

$$(NH_4)_2SO_4 + Ca(OH)_2 + 2H_2O \rightarrow CaSO_4 \cdot 2H_2O + 2NH_4OH \qquad (6)$$

The aqueous ammonia produced in the above reaction scheme (6) has a pH value of 10–11 and the calcium hydroxide or oxide is quantitatively dissolved, and therefore, the reaction (6) proceeds towards the right.

In the gypsum producing step, it is preferable to grow large gypsum crystals from the viewpoints of enhancing the dehydration efficiency and decreasing the hydrate ratio of the gypsum and further improving the physical properties of the gypsum product. The crystallization of gypsum consists of the crystalline nucleus forming step and the crystal growing step. The activating energy of each step is $E = 4.5 \times 10^3$ and $E = 16 \times 10^3$ in the crystalline nucleus forming step and the crystals growing step, respectively. The activating energy in the rate-determining step of diffusion is generally $E = 3 \times 10^3 - 5 \times 10^3$. From these values, it is understood that when the supersaturation is minimized and the temperature of the reactor is raised and further the mixture is appropriately stirred, the occurence of fine crystals can be prevented, and as the result, good crystals can be obtained.

The gypsum producing step is usually carried out under the conditions of the concentration of $NH_4^+ + NH_3$: 0.1 to 3.0 mole/liter, the concentration of the slurry: 10 to 30 % by weight, the ratio of $SO_4^{--}/Ca$: 1/0.5 to 1/1.0 and the temperature of solution: 50° to 85°C.

Under the conditions of the concentration of $NH_4^+ + NH_3$: 1.0 mole/liter, the concentration of the slurry: 10–20 % by weight, the ratio of $SO_4^{--}/Ca$: 1/0.95–1/0.98 and the temperature of the solution: 50°–60°C, the rate of the crystalline growth is in the rate-determining step. When the crystallization of gypsum is carried out under such conditions, the gypsum thus obtained is suitable for gypsum board and cement and the recovered aqueous ammonia can be circulated to the oxidation tower.

By using a flow sheet (FIG. V), the present method is illustrated when it is applied to the gypsum producing process. In FIG. V, (1) is a precooling-concentration tower, (2) is an oxidation tower, (3) is a $SO_2$ absorption tower, (4) is a slaked lime dissolving tank, (5) is a gypsum reactor, (6) is a liquid cyclone, (7) is a centrifugal dryer, (8) is a thickener, (9) is an ammonia tank, (A) is a boiler waste gas, (B) is a treated gas, (C) is water, (D) is a slaked lime and (E) is gypsum. The waste gas to be treated is charged into the precooling-concentration tower (1) and cooled at around 60°C and then transferred to the absorption tower (3) wherein the waste gas is contacted with an aqueous solution of ammonium sulfate acidified with sulfuric acid at a pH range of 3–4. The supplied absorbent may have a $SO_2$ partial pressure of 1 ppm or less than the $SO_2$ removal rate can be about 99 % or more. The treated gas obtained after absorbing $SO_2$ is taken out from top of the absorption tower (3). The $SO_2$ absorbed solution is sent to the oxidation tower (2) via the precooling-concentration tower (1) wherein the solution is concentrated. The concentrated $SO_2$ absorbed solution contains $SO_2$ and $HSO_3^-$ and the pH value thereof is somewhat lowered, and therefore, it is controlled at a pH range of 3–4 with aqueous ammonia which is supplied from the ammonia tank (9). In the oxidation tower (2), the $SO_2$ absorbed in the absorbent is oxidized with air or oxygen into sulfate ion. The aqueous solution of ammonium sulfate acidified with sulfuric acid thus obtained in the oxidation tower (2) is circulated to the absorption tower (3). When these steps are repeated, sulfate ion is accumulated in the circulating solution, and then a part of the solution is sent to the gypsum reactor (5). In the gypsum reactor (5), the ammonium sulfate is reacted with a slaked lime [$Ca(OH)_2$] which is supplied from the slaked lime dissolving tank (4), wherein the ratio of $SO_4^{--}/Ca^{++}$ is controlled to about 1/0.5–1/1.0 by checking the pH value thereof. The slurry of gypsum thus produced is condensed in the liquid cyclone (6), by which the concentration of the slurry is increased and further, the dwell time of the gypsum particles in the reactor is prolonged. Besides, the concentration of the slurry in the gypsum reactor (5) is controlled by the flow volume at the inlet and/or outlet of the reactor. The produced gypsum is dehydrated by centrifuge in the centrifugal dryer (7) and washed with water and then recovered. On the other hand, the produced aqueous ammonia is send to the ammonia tank (9) via the thickener (8) and is further circulated to the oxidation tower (2).

In the above process, water is supplied to dissolve calcium hydroxide or oxide in the slaked lime dissolving tank (4) and further for washing the gypsum in the centrifugal dryer (7). The amount of water is half or less of the amount taken out together with the treated gas (the temperature: more than 180°C, the concentration of $SO_2$: less than 2,000 ppm). The missing water may be supplemented at the precooling-concentration tower (1). Thus, the above process may be projected so that only gypsum is discharged from the whole system, and therefore, the method of the present invention may be carried out in a closed system. That is, in the closed system, the absorbent is directly contacted with hot waste gases and concentrated by evaporating water, and thereby the steps of absorption, oxidation and gypsum production are carried out without discharging water from the system.

Alternatively, the present method is illustrated when it is applied to the ammonium sulfate recovery process by using another flow sheet (FIG. VI). In FIG. VI, (1), (2), (3), (A), (B) and (C) are the same as in FIG. V, and (14) is an ammonium sulfate crystallizer, (15) is a dehydrator, (16) is a drier, (17) is an ammonia tank, and (F) is crystalline ammonium sulfate. The waste gas to be treated is charged into the precooling-concentration tower (1) and cooled at around 60°C and is then transferred to the absorption tower (3) wherein the waste gas is contacted with an aqueous solution of ammonium sulfate acidified with sulfuric acid at a pH range of 3–4. The supplied absorbent may have a $SO_2$ partial pressure of 1 ppm or less and the $SO_2$ removal rate can be about 99 % or more. The treated gas obtained after absorbing $SO_2$ is taken out from top of the absorption tower (3). The $SO_2$ absorbed solution is sent to the oxidation tower (2) via the precooling-concentration tower (1) wherein the solution is concentrated. The concentrated $SO_2$ absorbed solution contains $SO_2$ and $HSO_3^-$ and the pH value thereof is somewhat lowered, and therefore, it is controlled in a pH range of 3–4 with aqueous ammonia which is supplied from the ammonia tank (17). In the oxidation tower (2), the $SO_2$ absorbed in the absorbent is oxidized with air or oxygen to be converted into sulfate ion. The aqueous solution of ammonium sulfate acidified with sulfuric acid thus obtained in the oxidation tower (2) is circulated to the absorption tower (3). When these steps are repeated, sulfate ion is accumulated in the circulating solution, and then a part of the solution is sent to an ammonium sulfate crystallizer (14). In the ammonium sulfate crystallizer (14), the solution is concentrated by evaporating water and then ammonium sulfate is crystallized. The crystalline ammonium sulfate thus obtained is dehydrated in a dehydrator (15), dried in a drier (16) and then taken out.

Generally, the crystallization of ammonium sulfate is carried out under acidic conditions to prevent the production of ammonia and loss of ammonia. According to the present method, the solution is acidic (pH 3–4), and therefore, it is not necessary to newly add sulfuric acid.

The present invention is illustrated by the following Examples but not limited thereto.

EXAMPLE 1

A boiler waste gas produced by burning a heavy oil ($SO_2$ concentration: 1400–1600 ppm; temperature: 200°–250°C; 5,000 Nm³/H) is concentrated and cooled in a precooling-concentration tower (water jet multi-scrubber type; height: 2 m; width: 1 m; length: 2 m; L/G: 10 liters/Nm³). A part of the waste gas thus treated is sent to an absorption tower [valve tray type; the percent free area: 36.77 % (maximum) and 6.74 % (minimum); the stage: 5 stages (height per each stage: 0.5 m); the capacity for treating the gas: 300–1,000 Nm³/H; the sectional area of the tower: 0.2 m²]. An $SO_2$ absorbent is sufficiently oxidized in an oxidation tower (a water jet reactor; the size: 0.5 m³) and is then supplied to the absorption tower from the top thereof. The waste gas to be treated is supplied from the bottom of the absorption tower and is contacted with the absorbent in countercurrent. The $SO_2$ removal rate is measured in various L/G ratios under the conditions of the concentration of $SO_2$ at the inlet of the absorption tower: 700–800 ppm; the supplied absorbent: 12 m³/H; the volume of waste gas to be treated: 300–1,000 Nm³/H; and the temperature: 50°–53°C, by using the following absorbents:

(1) 7 % $CaSO_4.2H_2O$ aqueous solution

The pH value thereof is controlled with $CaCO_3$ and after oxidation in the oxidation tower, the absorbent is supplied to the absorption tower. The results are shown in Table 4.

Table 4

| | $SO_2$ removal rate (%) | | |
|---|---|---|---|
| | L/G ratio | | |
| Inlet pH value | 10 | 20 | 30 |
| 3.0 | 47 | 67 | 77 |
| 4.0 | 56 | 76 | 84 |

(2) 0.35 mole/liter $Al_2(SO_4)_3$ aqueous solution

The pH value thereof is controlled with a basic aluminum sulfate (40 % basicity) and after oxidation in the oxidation tower, the absorbent is supplied to the absorption tower. The results are shown in Table 5.

Table 5

| | $SO_2$ removal rate (%) | | |
|---|---|---|---|
| | L/G ratio | | |
| Inlet pH value | 15 | 20 | 30 |
| 2.5 | 66.5 | 75 | 83.5 |
| 2.7 | 72 | 81 | 91 |

(3) 0.5 mole/liter $(NH_4)_2SO_4$ aqueous solution

The pH value thereof is controlled with ammonia supplied from the ammonia tank and after oxidation in the oxidation tower the absorbent is supplied to the absorption tower. The results are shown in Table 6.

Table 6

| | $SO_2$ removal rate (%) | | | | | |
|---|---|---|---|---|---|---|
| Inlet | L/G ratio | | | | | |
| pH value | 10 | 15 | 20 | 25 | 30 | 40 |
| 2.0 | 48.5 | 58 | 64.5 | 68.5 | 71 | 75.5 |
| 3.0 | 73.5 | 82 | 87 | 90.5 | 92.5 | 95.5 |
| 3.7 | 83 | 90 | 93 | 97 | 99 | 100 |

The results are as follows: When $(NH_4)_2SO_4$ aqueous solution (pH: 3–4) is used, the $SO_2$ removal rate at L/G ratio: 15 is 90 %. To obtain the same $SO_2$ removal rate, the L/G ratio should be 40 or more in case of $CaSO_4.2H_2O$ solution and 30 or more in case of $Al_2(SO_4)_3$ solution.

When 7 % $CaSO_4.2H_2O$ aqueous solution is used, the dissolution of calcium carbonate does not sufficiently proceed at pH 4 or more, and therefore, a slurry of a mixture of calcium carbonate, calcium sulfate and calcium sufite is produced. As the result, the oxidation of sulfite does not sufficiently proceed in the oxidation tower.

There has hitherto been used the process of absorbing and removing $SO_2$ by using $Al_2(SO_4)_3$ aqueous solution, wherein the absorbed $SO_2 + HSO_3^-$ are oxidized and to the absorbent is added a basic calcium compound to produce gypsum and the resulting basic aluminum sulfate is used for neutralizing the absorbent. However, in such process, when the pH value in the gypsum reactor becomes over 3.0, a part of aluminum is precipitated as an aluminum hydroxide. Accordingly, this process can not proceed unless the pH value of the absorbent is maintained below 3.0.

EXAMPLE 2

The boiler waste gas as used in Example 1 (5,000 Nm³/H) is concentrated and cooled in the same pre-cooling-concentration tower as in Example 1, and is then sent to an absorption tower [a packed tower, the sectional area of which is: 1 m²; the bed height: 2 m; the packings: Netwring HA-18 (a trade name of the product of Dainippon Plastics Co., Ltd.)]. The $SO_2$ absorbent is sufficiently oxidized in the same oxidation tower as in Example 1 and is then supplied to the absorption tower from the top thereof. The waste gas to be treated is supplied from the bottom of the absorption tower and is contacted with the absorbent in countercurrent, and thereby the $SO_2$ is absorbed and removed. The absorbent which absorbs $SO_2$ is then oxidized with air in the oxidation tower under controlled pH value with ammonia and then is transferred to the absorption tower.

A part of the absorbent is sent a gypsum reactor (a stirred reactor; the size: 0.5 m³), wherein the solution is treated with a 20 % slaked lime slurry to produce gypsum. A part of the gypsum slurry is concentrated by using a liquid cyclone and then is returned to the gypsum reactor so that the concentration of the gypsum slurry is increased. The gypsum thus obtained is dehydrated by centrifuge, washed with water, dehydrated by centrifuge and then taken out. The aqueous ammonia is recovered and is circulated into the system.

In the above process, 0.5 mole/liter $(NH_4)_2SO_4$ aqueous solution (the temperature: 59°–60°C; the concentration of iron ion: 10–20 ppm) is used and the pH value thereof is controlled at 3–4. When the L/G ratio of the absorption tower is 8 liter/Nm³, the concentration of $SO_2$ at the outlet is 30–50 ppm and the $SO_2$ removal rate is 96–98 %.

The solution having absorbed $SO_2$ is removed at a rate of 0.5 m³/hour and is then reacted with a 20 % slaked lime slurry at a pH value of 10–10.5 to produce gypsum (the average residence time of the solution in the gypsum reactor: one hour; the concentration of the gypsum concentrated by liquid cyclone: 20–30 % by weight; the average residence time of gypsum: 4 hours; and the temperature of the reactor: 55°–60°C). The gypsum thus produced is dehydrated by centrifuge, washed with water, dehydrated by centrifuge and then recovered. The physical properties of the gypsum are shown in Table 7.

Table 7

| | |
|---|---|
| $CaSO_4.2H_2O$: | |
| pH value | 8.0 |
| Water content | 8.95 % |
| Bulk density | 1.06 |
| $CaSO_4.O.5H_2O$: | |
| Water amount miscible | |

Table 7 -continued

| | |
|---|---|
| therewith | 66.8 % |
| Initiation of flowing | 5 min. and 50 sec. |
| Initiation of solidification | 9 min. and 40 sec. |
| Surface hardening | 14 min. and 20 sec. |
| Finish of solidification | 33 min. and 30 sec. |
| Maximum temperature | 35.5°C |
| Wetting tensile strength | 13.5 kg/cm$^2$ |

EXAMPLE 3

In the same manner as described in Example 2, the boiler waste gas is treated with 3.0 mole/liter $(NH_4)_2SO_4$ aqueous solution (the pH value: 3.5–3.7; the temperature: 60°–61°C; the concentration of iron ion: 20–30 ppm).

When the L/G ratio of the absorption tower is 8 liter/Nm$^3$ and the size of the oxidation tower is 0.5 m$^3$, the concentration of $SO_2$ at the outlet is 100–150 ppm and the $SO_2$ removal rate is 90–93 %. In this case, the concentration of $SO_2 + HSO_3^-$ in the absorbent supplied to the absorption tower is $1 \times 10^{-3} - 2 \times 10^{-3}$ mole/liter, which means that the oxidation is insufficient.

When the size of the oxidation tower is 1.0 m$^3$, the concentration of $SO_2$ at the outlet is 30–40 ppm and the $SO_2$ removal rate is 96–98 %. In this case, the concentration of $SO_2 + HSO_3^-$ in the absorbent supplied to the absorption tower is $10^{-4}$ mole/liter or less.

The absorbent is withdrawn and is oxidized for an additional 10 minutes in the oxidation tower. The solution thus treated is filtered by a filter paper and the filtrate is concentrated to give crystals of ammonium sulfate.

Analysis of the product is as follows:

$NH_3$: 25.6 %; $SO_3$: 60.6 %; $Fe_2O_3$: 0.01 %; CaO: 0.02 %; Ni and Mn: slight amount; Color: white.

What is claimed is:

1. A method for removing sulfur dioxide from waste gases by a wet oxidation-absorption method, which comprises absorbing $SO_2$ contained in the waste gases with an absorbent consisting essentially of an aqueous solution of ammonium sulfate acidified with sulfuric acid to a pH of 3–4 in an adsorption tower, the concentration of said aqueous solution of ammonium sulfate being 0.1 to 3.0 moles/liter; oxidizing the absorbed $SO_2$ and dissociated $HSO_3^-$ with air or oxygen in an oxidation tower at a temperature of 50° to 80°C to $SO_4^{--}$ and $HSO_4^-$, the $SO_2$ absorbing capacity of the aqueous solution of ammonium sulfate thereby being restored; and circulating the recovered aqueous solution of ammonium sulfate to the absorption tower.

2. The method for removing sulfur dioxide from waste gases according to claim 1, wherein the absorption tower has a L/G ratio of 5 to 10 liters/Nm$^3$.

3. The method for removing sulfur dioxide from waste gases according to claim 1, wherein the oxidation is carried out in the presence of an ion of a metal selected from the group consisting of iron, nickel, cobalt and manganese.

4. The method for removing sulfur dioxide from waste gases according to claim 3, wherein the concentration of the metal in the aqueous solution of ammonium sulfate is 1 to 1,000 ppm.

5. A method for removing sulfur dioxide from waste gases, which comprises absorbing $SO_2$ contained in the waste gases with an absorbent consisting essentially of an aqueous solution of ammonium sulfate acidified with sulfuric acid to a pH of 3 to 4 in an absorption tower, the concentration of said aqueous solution of ammonium sulfate being 0.1 to 3.0 moles/liter; oxidizing the absorbed $SO_2$ with air or oxygen in an oxidation tower at a temperature of 50° to 80°C to give sulfuric acid; controlling the pH value of the absorbent at 3 to 4 with aqueous ammonia in the oxidation tower and the $SO_2$ absorbing capacity of the absorbent thereby being restored; circulating the recovered absorbent to the absorption tower; treating a part of the circulating solution with calcium hydroxide or oxide in a gypsum reactor wherein the concentration of $NH_4^+ + NH_3$ is 0.1 to 3.0 mole/liter, the concentration of the slurry is 10 to 30% by weight, the ratio of $SO_4^{--}/Ca$ is 1/0.5 to 1/1.0 and the temperature of the solution is 50° to 85°C, to form gypsum and aqueous ammonia; and circulating the resulting aqueous ammonia to the oxidation tower to control the pH value of the absorbent.

6. A method for removing sulfur dioxide from waste gases, which comprises absorbing $SO_2$ contained in the waste gases with an absorbent consisting essentially of an aqueous solution of ammonium sulfate acidified with sulfuric acid at a pH of 3 to 4 in an absorption tower, the concentration of said aqueous solution of ammonium sulfate being 0.1 to 3.0 mole/liter; oxidizing the absorbed $SO_2$ with air or oxygen in an oxidation tower at a temperature of 50 to 80°C to give sulfuric acid; controlling the pH value of the absorbent at 3 to 4 with aqueous ammonia in the oxidation tower, the $SO_2$ absorbing capacity of the absorbent thereby being restored; concentrating a part of the circulating solution to give crystalline ammonium sulfate; and then recovering the resulting crystalline ammonium sulfate.

7. The method for removing sulfur dioxide from waste gases according to claim 1, wherein the absorbent is directly contacted with hot waste gases and is concentrated by evaporating water, and thereby the steps of the absorption and the oxidation being carried out without discharging water in a closed system.

8. The method for removing sulfur dioxide from waste gases according to claim 5, wherein the absorbent is directly contacted with hot waste gases and is concentrated by evaporating water, and thereby the steps of the absorption, the oxidation and the gypsum production being carried out without discharging water in a closed system.

9. The method for removing sulfur dioxide from waste gases according to claim 6, wherein the absorbent is directly contacted with hot waste gases and is concentrated by evaporating water, and thereby the steps of the absorption, the oxidation and the ammonium sulfate production being carried out without discharging water in a closed system.

* * * * *